US012596491B2

(12) United States Patent
Card et al.

(10) Patent No.: US 12,596,491 B2
(45) Date of Patent: Apr. 7, 2026

(54) DYNAMICALLY ADJUSTING MEMORY ALLOCATIONS BASED ON QUALITY-OF-SERVICE (QoS) POOL THRESHOLD VALUES IN PROCESSOR-BASED DEVICES

(71) Applicant: Microsoft Technology Licensing, LLC, Redmond, WA (US)

(72) Inventors: Cameron Card, Raleigh, NC (US); Thomas Basnight, Raleigh, NC (US); Jason Panavich, Raleigh, NC (US); Venkata Ravichandra Ravi, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/680,356

(22) Filed: May 31, 2024

(65) Prior Publication Data

US 2025/0370639 A1 Dec. 4, 2025

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0673* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 2011/0246742 A1 | 10/2011 | Kogen | |
| 2012/0131302 A1* | 5/2012 | Nasu ..................... | G06F 3/0685 |
| | | | 711/171 |
| 2015/0268880 A1 | 9/2015 | Asayama | |
| 2020/0371689 A1* | 11/2020 | Sen ......................... | G06F 3/067 |
| 2023/0020027 A1* | 1/2023 | Buyukdura ........... | H04W 28/16 |
| 2024/0078199 A1 | 3/2024 | Lam | |
| 2024/0160553 A1* | 5/2024 | Halaharivi ............ | G06F 9/4881 |

OTHER PUBLICATIONS

Extended European Search Report Received in European Patent Application No. 25178541.6 mailed on Oct. 13, 2025, 12 pages.

* cited by examiner

*Primary Examiner* — Khoa D Doan
(74) *Attorney, Agent, or Firm* — Newport IP, LLC; Scott Y. Shigeta

(57) ABSTRACT

Dynamically adjusting memory allocations based on Quality-of-Service (QoS) pool threshold values in processor-based devices is disclosed herein. In one exemplary embodiment, a processor-based device provides a storage controller circuit communicatively coupled to a memory device. The storage controller circuit comprises a dedicated storage device and a plurality of pool threshold values corresponding to a plurality of pools, wherein each pool corresponds to one or more QoS levels, and each pool threshold value defines an allocation of the dedicated storage device for the corresponding pool. For each pool of the plurality of pools, the storage controller circuit collects a usage statistic during a sampling period, and determines, based on the usage statistic, whether to modify the pool threshold value corresponding to the pool. The storage controller circuit then modifies the pool threshold value corresponding to the pool based on the usage statistic, responsive to determining to modify the pool threshold value.

20 Claims, 6 Drawing Sheets

—200

—202

Figure 1:
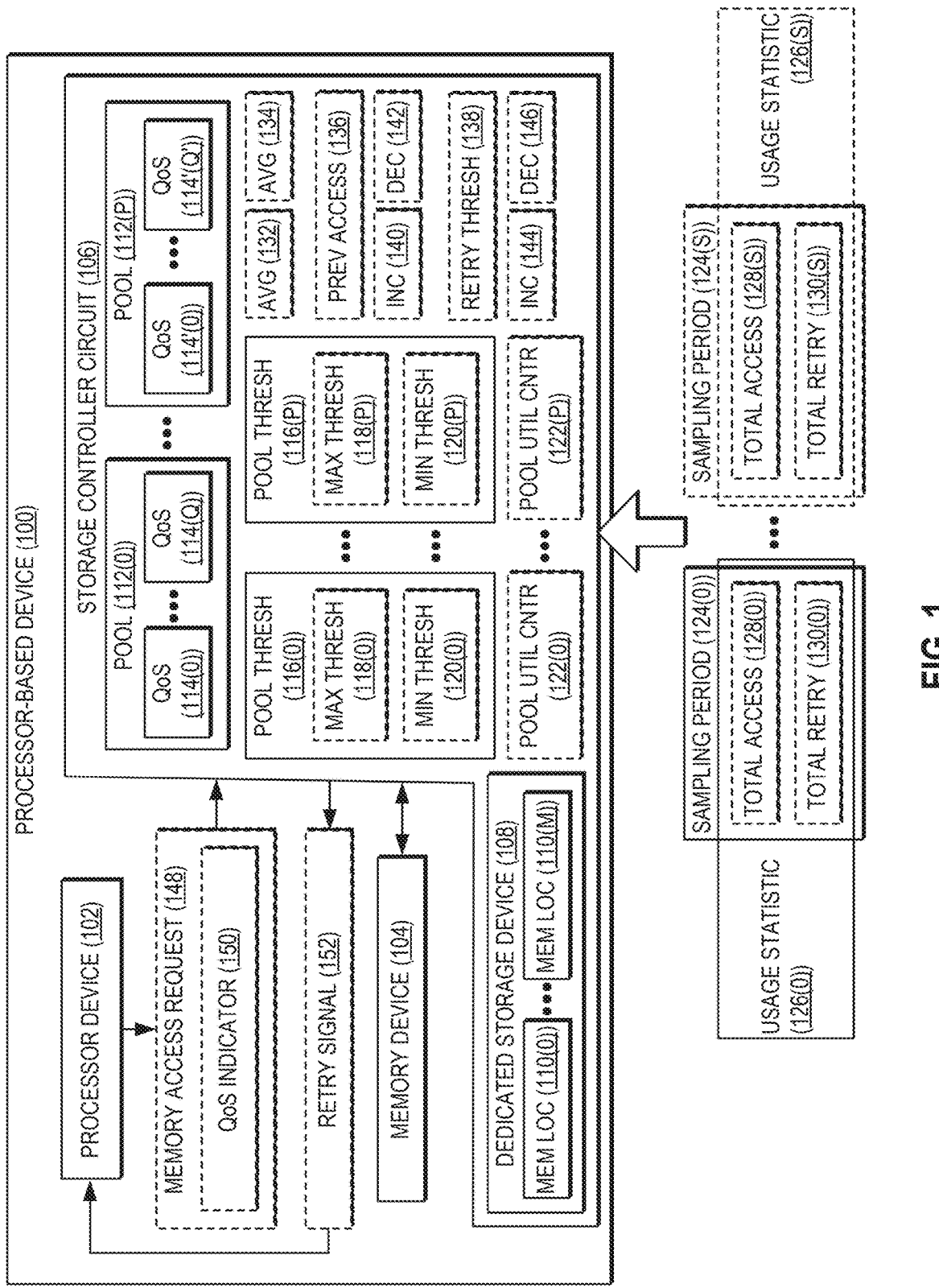

FOR EACH POOL (112(0)) OF A PLURALITY OF POOLS (112(0)-112(P)) EACH CORRESPONDING TO ONE OR MORE QUALITY-OF-SERVICE (QoS) LEVELS (114(0)-114(Q), 114'(0)-114'(Q')):

—204

COLLECT, BY A STORAGE CONTROLLER CIRCUIT (106) OF A PROCESSOR-BASED DEVICE (100), A USAGE STATISTIC (126(0)) FOR THE POOL (112(0)) DURING A SAMPLING PERIOD (124(0))

—206

ACCUMULATE A PLURALITY OF USAGE STATISTICS (126(0)-126(S)) COMPRISING THE USAGE STATISTIC (126(0)) OVER A PLURALITY OF SAMPLING PERIODS (124(0)-124(S)) COMPRISING THE SAMPLING PERIOD (124(0))

—208

DETERMINE, BY THE STORAGE CONTROLLER CIRCUIT (106) BASED ON THE USAGE STATISTIC (126(0)), WHETHER TO MODIFY A POOL THRESHOLD VALUE (116(0)) CORRESPONDING TO THE POOL (112(0)) AMONG A PLURALITY OF POOL THRESHOLD VALUES (116(0)-116(P)), WHEREIN EACH POOL THRESHOLD VALUE OF THE PLURALITY OF POOL THRESHOLD VALUES (116(0)-116(P)) DEFINES AN ALLOCATION OF A DEDICATED STORAGE DEVICE (108) OF THE STORAGE CONTROLLER CIRCUIT (106) FOR A CORRESPONDING POOL OF THE PLURALITY OF POOLS (112(0)-112(P))

—210

DETERMINE WHETHER TO MODIFY THE POOL THRESHOLD VALUE (116(0)) CORRESPONDING TO THE POOL (112(0)) BASED ON AN AVERAGE (132, 134) OF THE PLURALITY OF USAGE STATISTICS (126(0))

—212

RESPONSIVE TO DETERMINING TO MODIFY THE POOL THRESHOLD VALUE (116(0)) CORRESPONDING TO THE POOL (112(0)), MODIFY, BY THE STORAGE CONTROLLER CIRCUIT (106), THE POOL THRESHOLD VALUE (116(0)) BASED ON THE USAGE STATISTIC (126(0))

TO B IN
FIG. 2B

FIG. 2A

DYNAMICALLY ADJUSTING MEMORY ALLOCATIONS BASED ON QUALITY-OF-SERVICE (QoS) POOL THRESHOLD VALUES IN PROCESSOR-BASED DEVICES

FIELD OF THE DISCLOSURE

The technology of the disclosure relates to memory allocation in processor-based devices, and, more particularly, to allocation of memory resources based on Quality-of-Service (QoS) levels.

BACKGROUND

A conventional processor-based device includes hardware, generally referred to herein as a "storage controller circuit," that is responsible for managing the flow of data between a memory device and other elements of the processor-based device. The storage controller circuit receives memory access requests (such as memory read requests and memory write requests) from, e.g., processor devices, peripheral devices, or other storage devices, and determines which memory access requests to perform and in what order. In doing so, the storage controller circuit may perform tasks such as pointer and write/read location control, aggregation and multiplexing of data from multiple sources, and throughput control.

In scenarios in which multiple requestors seek access to the memory device, the storage controller circuit must manage memory access requests in a manner that maximizes throughput while also ensuring access to every requestor. Conventional storage controller circuits may manage memory access requests from multiple requestors by implementing a credit system under which each requestor is assigned a certain number of credits that allow the requestor to issue memory access requests. The requestor can issue a subsequent memory access request only if it has a sufficient number of credits available. A conventional storage controller circuit may also manage memory access requests from multiple requestors using approaches such as queuing memory access requests in a request queue for processing in-order, applying scheduling algorithms to optimize the order of processing, and/or by using maximum and minimum thresholds to define the allocation of dedicated storage for managing requests from different requestors.

However, such conventional approaches for managing memory access for multiple requestors may still lack the flexibility to quickly adjust to changing traffic patterns and usage statistics. In particular, conventional approaches using maximum and minimum thresholds generally require frequent maintenance and updates in the form of external software updates to the thresholds to account for changing operating conditions.

SUMMARY

Exemplary embodiments disclosed herein provide dynamic adjustment of memory allocations based on Quality-of-Service (QoS) pool threshold values in processor-based devices. In this regard, in one exemplary embodiment, a processor-based device provides a storage controller circuit that is communicatively coupled to a memory device. The storage controller circuit is configured to define a plurality of pools that each correspond to one or more QoS levels that may be associated with memory access requests directed to the memory device. Each of the pools is associated with one or more corresponding pool threshold values (e.g., maximum threshold values and/or minimum threshold values, as non-limiting examples) that define an allocation of a dedicated storage device of the storage controller for managing and queuing memory access requests for that pool (and, by extension, for the QoS level(s) that correspond to that pool).

In exemplary operation, the storage controller circuit periodically performs a series of operations to dynamically adjust the allocation of the dedicated storage device for each pool. The storage controller circuit collects a usage statistic (e.g., a total number of memory accesses and/or a total number of retried memory accesses, as non-limiting examples) for the pool during a sampling period. In some embodiments, the storage controller circuit may accumulate a plurality of usage statistics over a plurality of sampling periods, and then determines an average of the usage statistics.

The storage controller circuit subsequently determines, based on the usage statistic (or the average thereof), whether to modify a pool threshold value corresponding to the pool. In embodiments in which the pool threshold value comprises a maximum threshold value, the usage statistic may comprise a total number of memory accesses, and the storage controller circuit may determine whether to modify the pool threshold value based on the usage statistic by comparing the total number of memory accesses for the pool during the sampling period with a previous total number of memory accesses for the pool. In embodiments in which the pool threshold value comprises a minimum threshold value, the usage statistic may comprise a total number of retried memory accesses, and the storage controller circuit may determine whether to modify the pool threshold value based on the usage statistic by comparing a total number of retried memory accesses for a pool during a sampling period with a retry threshold value.

In response to a determination to modify the pool threshold value corresponding to the pool, the storage controller circuit modifies the pool threshold value based on the usage statistic. In this manner, the storage controller circuit disclosed herein can efficiently manage throughput while also handling QoS control, in the same control logic. In some embodiments, the storage controller circuit may modify the pool threshold value by incrementing a maximum threshold value corresponding to the pool by an increment value if the storage controller circuit determines that a total number of memory accesses is greater than a previous total number of memory accesses, and decrementing the maximum threshold value by a decrement value if the total number of memory access is less than the previous total number of memory accesses. Some embodiments may provide that the storage controller circuit increments a minimum threshold value corresponding to the pool by an increment value if the storage controller circuit determines that the total number of retried memory accesses is greater than the retry threshold value, and decrements the minimum threshold value by a decrement value if the storage controller circuit determines that the total number of retried memory accesses is less than the retry threshold value. Some such embodiments may further provide that the storage controller circuit only increments the minimum threshold value if a sum of each minimum threshold value of the plurality of minimum threshold values is less than a total number of memory locations of the dedicated storage device.

The storage controller circuit in some embodiments may receive a memory access request that is directed to the memory device, and that comprises an indicator of a QoS level for the memory access request. The storage controller circuit in such embodiments identifies a target pool corresponding to the QoS level, and determines, based on a pool utilization counter corresponding to the target pool and a pool threshold value corresponding to the target pool, whether an allocation of the dedicated storage device for the target pool allows the memory access request to be performed. If so, the storage controller circuit performs the memory access request and updates the pool utilization counter. However, if the storage controller circuit determines that the allocation of the dedicated storage device for the target pool does not allow the memory access request to be performed, the storage controller circuit issues a retry signal for the memory access request.

In another exemplary embodiment, a processor-based device comprises a memory device, and a storage controller circuit communicatively coupled to the memory device. The storage controller circuit comprises a dedicated storage device and a plurality of pool threshold values corresponding to a plurality of pools, wherein each pool of the plurality of pools corresponds to one or more QoS levels, and each pool threshold value of the plurality of pool threshold values defines an allocation of the dedicated storage device for the corresponding pool. The storage controller circuit is configured to, for each pool of the plurality of pools, collect a usage statistic for the pool during a sampling period. The storage controller circuit is further configured to determine, based on the usage statistic, whether to modify the pool threshold value corresponding to the pool among the plurality of pool threshold values. The storage controller circuit is also configured to, responsive to determining to modify the pool threshold value corresponding to the pool, modify the pool threshold value based on the usage statistic.

In another exemplary embodiment, a method for dynamically adjusting memory allocations based on QoS pool threshold values is provided. The method comprises, for each pool of a plurality of pools each corresponding to one or more QoS levels, collecting, by a storage controller circuit of a processor-based device, a usage statistic for the pool during a sampling period. The method further comprises determining, by the storage controller circuit based on the usage statistic, to modify a pool threshold value corresponding to the pool among a plurality of pool threshold values, wherein each pool threshold value of the plurality of pool threshold values defines an allocation of a dedicated storage device of the storage controller circuit for a corresponding pool of the plurality of pools. The method also comprises, responsive to determining to modify the pool threshold value corresponding to the pool, modifying, by the storage controller circuit, the pool threshold value based on the usage statistic.

In another exemplary embodiment, a non-transitory computer-readable medium is provided, the computer-readable medium having stored thereon computer-executable instructions which, when executed by a processor device of a processor-based device, cause the processor device to, for each pool of a plurality of pools each corresponding to one or more QoS levels, collect a usage statistic for the pool during a sampling period. The computer-executable instructions further cause the processor device to determine, based on the usage statistic, whether to modify a pool threshold value corresponding to the pool among a plurality of pool threshold values, wherein each pool threshold value of the plurality of pool threshold values defines an allocation of a dedicate storage device of a storage controller circuit for a corresponding pool of the plurality of pools. The computer-executable instructions also cause the processor device to, responsive to determining to modify the pool threshold value corresponding to the pool, modify the pool threshold value based on the usage statistic.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 2B:
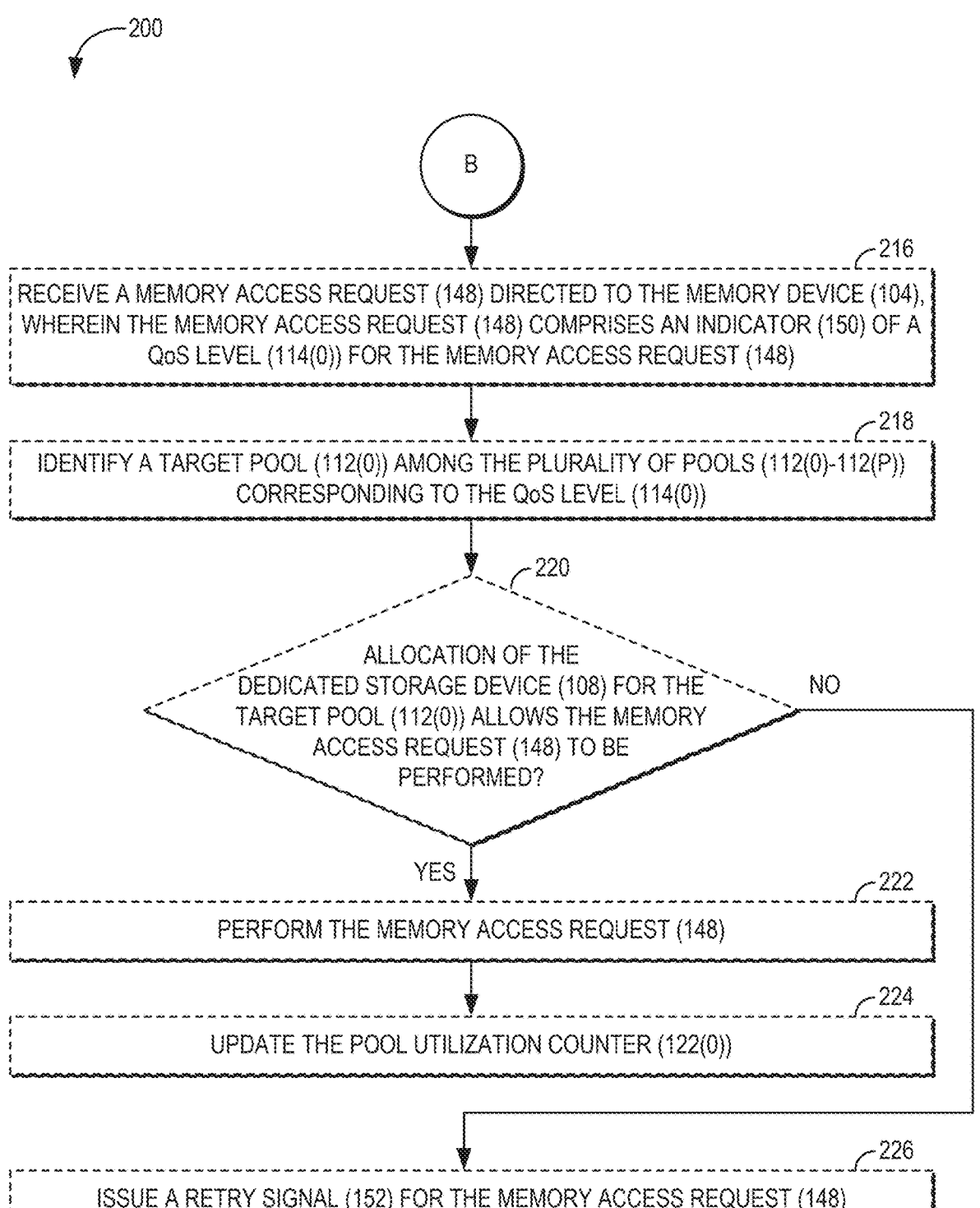
Figure 3:
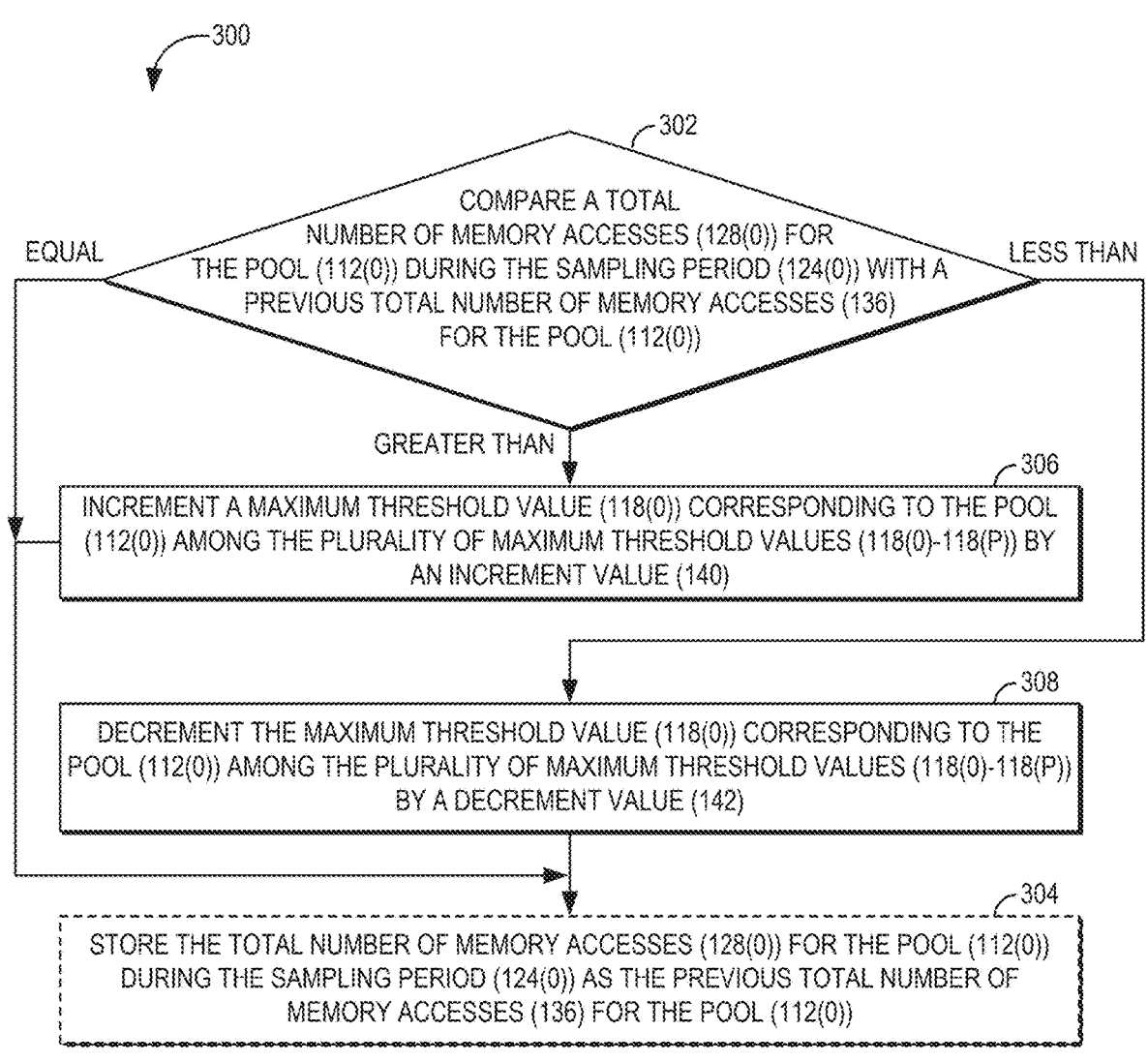
Figure 4:
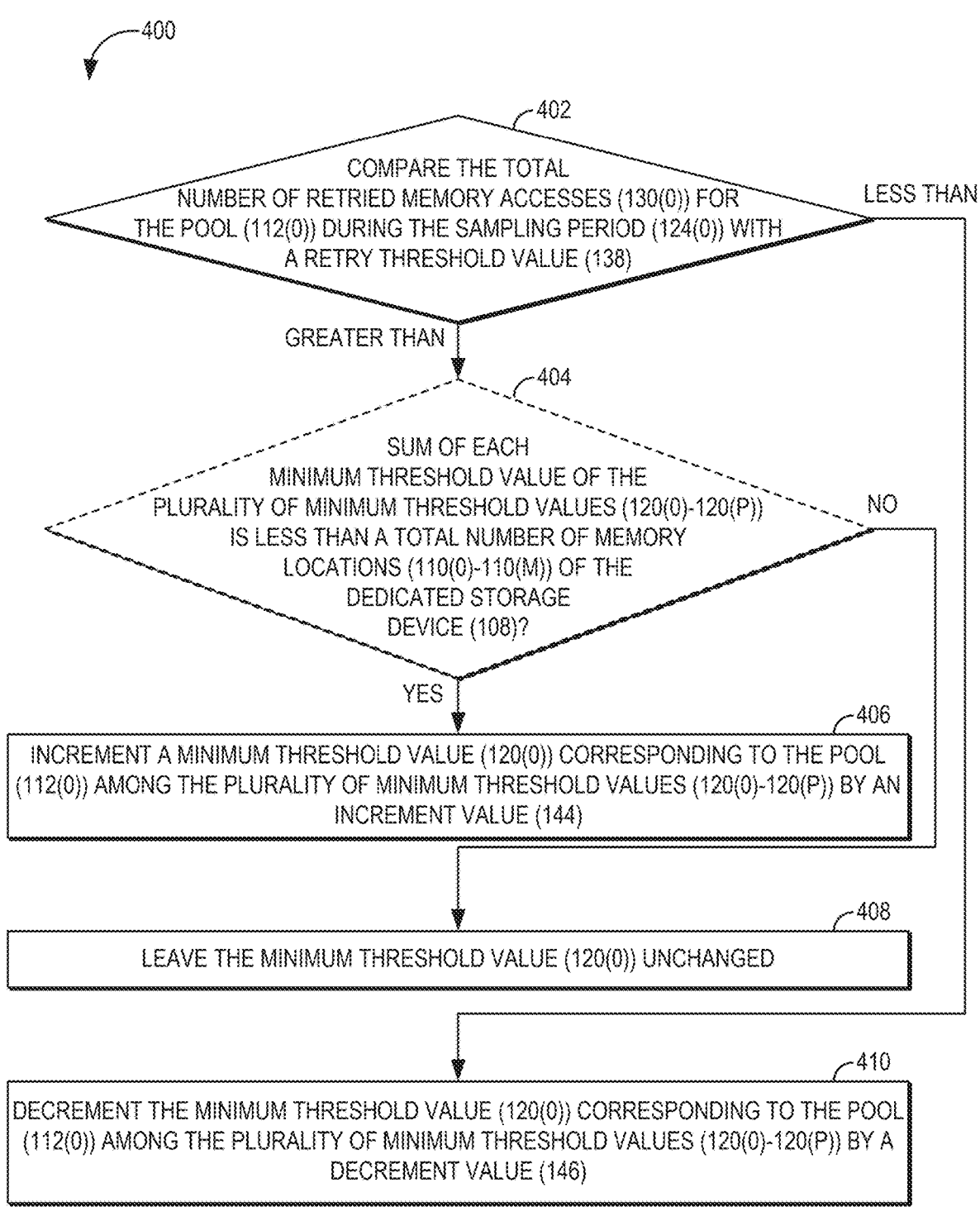
Figure 5:
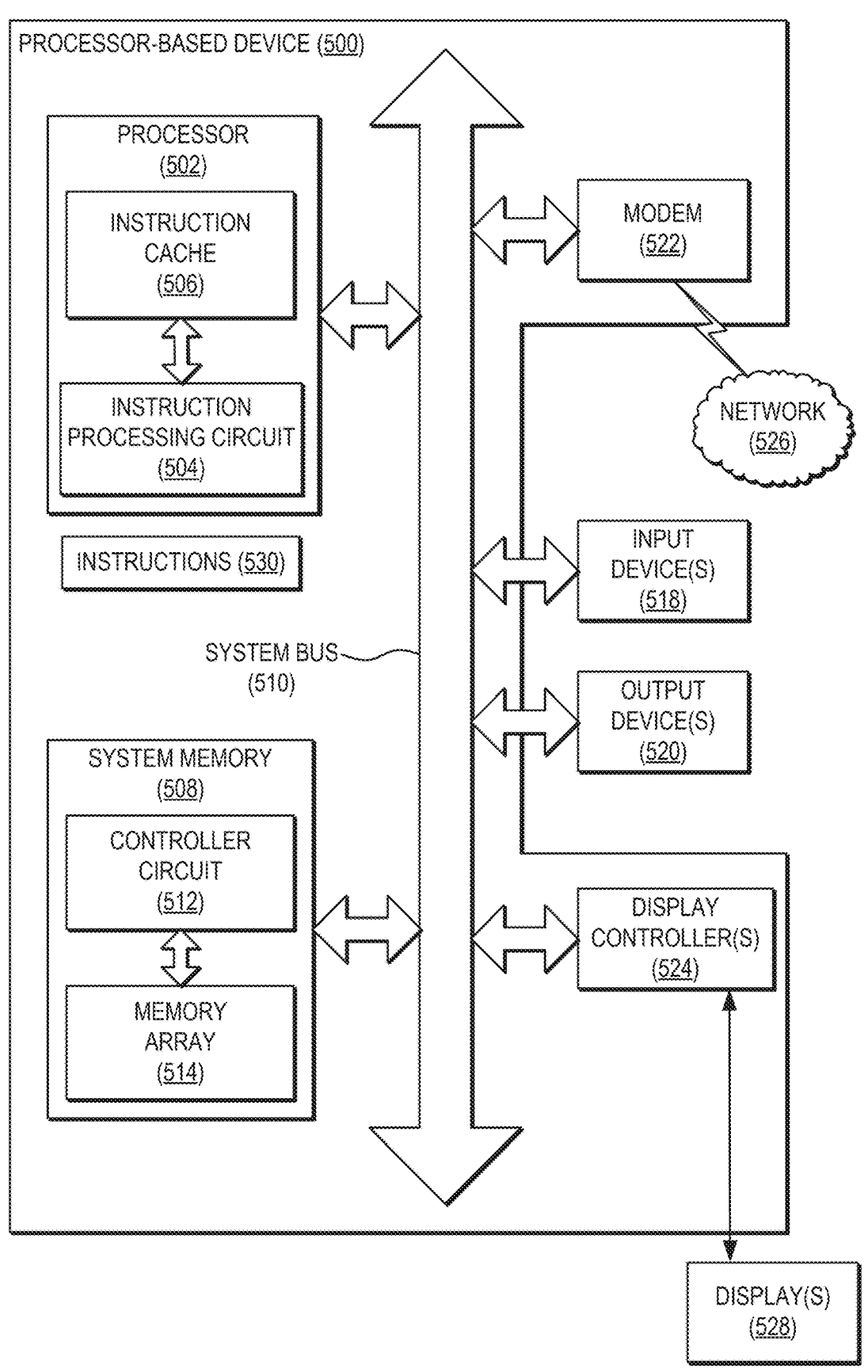

FIG. 1 is a block diagram of an exemplary processor-based device that includes a storage controller circuit configured to dynamically adjust memory allocations based on Quality-of-Service (QoS) pool threshold values;

FIGS. 2A-2B provide a flowchart illustrating exemplary operations of the storage controller circuit of FIG. 1 for dynamically adjusting memory allocations based on QoS pool threshold values, according to some embodiments;

FIG. 3 is a flowchart illustrating further exemplary operations of the storage controller circuit of FIG. 1 for updating a maximum threshold value for a pool based on a total number of memory accesses during a sampling period compared to a previous total number of memory accesses, according to some embodiments;

FIG. 4 is a flowchart illustrating additional exemplary operations of the storage controller circuit of FIG. 1 for updating a minimum threshold value for a pool based on a total number of retried memory accesses during a sampling period compared to a retry threshold value, according to some embodiments; and FIG. 5 is a block diagram of an exemplary processor-based device, such as the processor-based device of FIG. 1, that is configured to dynamically adjust memory allocations based on QoS pool threshold values.

DETAILED DESCRIPTION

Exemplary embodiments disclosed herein provide dynamic adjustment of memory allocations based on Quality-of-Service (QoS) pool threshold values in processor-based devices. In this regard, in one exemplary embodiment, a processor-based device provides a storage controller circuit that is communicatively coupled to a memory device. The storage controller circuit is configured to define a plurality of pools that each correspond to one or more QoS levels that may be associated with memory access requests directed to the memory device. Each of the pools is associated with one or more corresponding pool threshold values (e.g., maximum threshold values and/or minimum threshold values, as non-limiting examples) that define an allocation of a dedicated storage device of the storage controller for managing and queuing memory access requests for that pool (and, by extension, for the QoS level(s) that correspond to that pool).

In exemplary operation, the storage controller circuit periodically performs a series of operations to dynamically adjust the allocation of the dedicated storage device for each pool. The storage controller circuit collects a usage statistic (e.g., a total number of memory accesses and/or a total number of retried memory accesses, as non-limiting examples) for the pool during a sampling period. In some embodiments, the storage controller circuit may accumulate a plurality of usage statistics over a plurality of sampling periods, and then determines an average of the usage statistics.

The storage controller circuit subsequently determines, based on the usage statistic (or the average thereof), whether to modify a pool threshold value corresponding to the pool. In embodiments in which the pool threshold value comprises a maximum threshold value, the usage statistic may comprise a total number of memory accesses, and the storage controller circuit may determine whether to modify the pool threshold value based on the usage statistic by comparing the total number of memory accesses for the pool during the sampling period with a previous total number of memory accesses for the pool. In embodiments in which the pool threshold value comprises a minimum threshold value, the usage statistic may comprise a total number of retried memory accesses, and the storage controller circuit may determine whether to modify the pool threshold value based on the usage statistic by comparing a total number of retried memory accesses for a pool during a sampling period with a retry threshold value.

In response to a determination to modify the pool threshold value corresponding to the pool, the storage controller circuit modifies the pool threshold value based on the usage statistic. In this manner, the storage controller circuit disclosed herein can efficiently manage throughput while also handling QoS control, in the same control logic. In some embodiments, the storage controller circuit may modify the pool threshold value by incrementing a maximum threshold value corresponding to the pool by an increment value if the storage controller circuit determines that a total number of memory accesses is greater than a previous total number of memory accesses, and decrementing the maximum threshold value by a decrement value if the total number of memory access is less than the previous total number of memory accesses. Some embodiments may provide that the storage controller circuit increments a minimum threshold value corresponding to the pool by an increment value if the storage controller circuit determines that the total number of retried memory accesses is greater than the retry threshold value, and decrements the minimum threshold value by a decrement value if the storage controller circuit determines that the total number of retried memory accesses is less than the retry threshold value. Some such embodiments may further provide that the storage controller circuit only increments the minimum threshold value if a sum of each minimum threshold value of the plurality of minimum threshold values is less than a total number of memory locations of the dedicated storage device.

The storage controller circuit in some embodiments may receive a memory access request that is directed to the memory device, and that comprises an indicator of a QoS level for the memory access request. The storage controller circuit in such embodiments identifies a target pool corresponding to the QoS level, and determines, based on a pool utilization counter corresponding to the target pool and a pool threshold value corresponding to the target pool, whether an allocation of the dedicated storage device for the target pool allows the memory access request to be performed. If so, the storage controller circuit performs the memory access request and updates the pool utilization counter. However, if the storage controller circuit determines that the allocation of the dedicated storage device for the target pool does not allow the memory access request to be performed, the storage controller circuit issues a retry signal for the memory access request.

In this regard, FIG. 1 illustrates an exemplary processor-based device 100 that includes a processor device 102. The processor device 102 may comprise one or more processor cores (not shown), each of which may include an instruction processing circuit (not shown) comprising an execution pipeline (not shown) for executing computer instructions. It is to be understood that some embodiments of the processor-based device 100 may comprise multiple processor devices 102 rather than the single processor device 102 shown in the example of FIG. 1, and further that the processor-based device 100 may be one of multiple processor-based devices 100, e.g., organized as a cluster. In some embodiments, the processor-based device 100 may comprise a System-on-Chip (SoC), as a non-limiting example.

As seen in FIG. 1, the processor device 102 is communicatively coupled to a memory device 104 via a storage controller circuit 106. The memory device 104 in some embodiments may comprise a memory device such as a Double Data Rate Synchronous Dynamic Random-Access Memory (DDR SDRAM) in which data may be stored. While the memory device 104 is shown in FIG. 1 as an integral element of the processor-based device 100, some embodiments may provide that the memory device 104 comprises an external memory device, as a non-limiting example. The storage controller circuit 106 is configured to manage incoming and outgoing access to the memory device 104. This may include, e.g., control of pointers and write/read locations, aggregation and multiplexing of data from multiple sources, and control of throughput. To manage and queue memory access requests to the memory device 104, the storage controller circuit 106 includes a dedicated storage device 108 that comprises a plurality of memory locations 110(0)-110(M). The dedicated storage device 108 of the storage controller circuit 106 may comprise any type of storage device, including but not limited to memory devices such as Random Access Memory (RAM) devices, flip-flop circuits, registers, and the like.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the processor device 102 may further include one or more instruction caches, unified caches, controller circuits, interconnect buses, and/or additional memory devices, caches, and/or controller circuits.

As noted above, conventional approaches for managing memory access for multiple requestors by the storage controller circuit 106 may lack the flexibility to quickly adjust to changing traffic patterns and usage statistics. In particular, conventional approaches using maximum and minimum thresholds to control allocation of the dedicated storage device 108 generally require frequent maintenance and updates in the form of external software updates to the thresholds to account for changing operating conditions.

In this regard, the storage controller circuit 106 is configured to dynamically adjust allocation of the dedicated storage device 108 based on QoS pool threshold values. The storage controller circuit 106 defines a plurality of pools 112(0)-112(P) that each correspond to one or more QoS levels with which memory access requests directed to the memory device 104 may be associated. Thus, in the example of FIG. 1, the pool 112(0) corresponds to QoS levels (captioned as "QoS" in FIG. 1) 114(0)-114(Q), while the pool 112(P) corresponds to QoS levels (captioned as "QoS" in FIG. 1) 114'(0)-114'(Q'). The QoS levels 114(0)-114(Q), 114'(0)-114'(Q') specify different priorities and capacity allocations with which associated memory access requests will be handled to guarantee predefined levels of performance.

The storage controller circuit 106 further comprises one or more pool threshold values (captioned as "POOL THRESH" in FIG. 1) 116(0)-116(P) that each correspond to a pool of the plurality of pools 112(0)-112(P). The pool threshold values 116(0)-116(P) define an allocation of the dedicated storage device 108 for each of the corresponding pools 112(0)-112(P) by defining, e.g., maximum and/or minimum numbers of the memory locations 110(0)-110(M) that can be allocated for each of the pools 112(0)-112(P) (and, by extension, to the groupings of QoS levels 114(0)-114(Q), 114'(0)-114'(Q') defined by the pools 112(0)-112(P)).

For example, the pool threshold values 116(0)-116(P) in some embodiments may comprise a plurality of maximum threshold values (captioned as "MAX THRESH" in FIG. 1) 118(0)-118(P) that specify a maximum number of the memory locations 110(0)-110(M) that can be allocated for use by each corresponding pool 112(0)-112(P). The maximum threshold values 118(0)-118(P) may be used for QoS control by forcing the corresponding pools 112(0)-112(P) to adhere to a maximum number of the memory locations 110(0)-110(M) even if there is availability in the dedicated storage device 108. Some embodiments may provide that the pool threshold values 116(0)-116(P) comprise a plurality of minimum threshold values (captioned as "MIN THRESH" in FIG. 1) 120(0)-120(P) that provide starvation control by specifying a minimum number of the memory locations 110(0)-110(M) that will always be allocated for use by each corresponding pool 112(0)-112(P). Note that the sum of the minimum threshold values 120(0)-120(P) must be less than or equal to the number of memory locations 110(0)-110(M) of the dedicated storage device 108. The storage controller circuit 106 according to some embodiments also provides a plurality of pool utilization counters (captioned as "POOL UTIL CNTR" in FIG. 1) 122(0)-122(P) that each store a number of the memory locations 110(0)-110(M) of the dedicated storage device 108 currently in use by the corresponding pool 112(0)-112(P).

In exemplary operation, the storage controller circuit 106 performs a series of operations for each of the pools 112(0)-112(P) to dynamically adjust memory allocation. Using the pool 112(0) as an example (with the understanding that corresponding operations are performed for all of the pools 112(0)-112(P)), at periodic intervals, the storage controller circuit 106 collects a usage statistic 126(0) for the pool 112(0) during a sampling period 124(0). The usage statistic 126(0) may comprise a total number of memory accesses 128(0) that are associated with any of the QoS levels 114(0)-114(Q) of the pool 112(0), and/or may comprise a total number of retried memory accesses 130(0) associated with any of the QoS levels 114(0)-114(Q) of the pool 112(0). In some embodiments, the storage controller circuit 106 may accumulate a plurality of usage statistics 126(0)-126(S) over multiple sampling periods 124(0)-124(S) (based on, e.g., a configurable parameter (not shown) that may be set to enable averaging). The accumulated value (not shown) of the plurality of usage statistics 126(0)-126(S) may then be averaged (e.g., when the number S of sampling periods 124(0)-124(S) is a power of two (2), the accumulated plurality of usage statistics 126(0)-126(S) may be averaged by right-shifting the accumulated value by a number of bits equal to $\log_2(S)$). For example, the accumulated value of the total numbers of memory accesses (captioned as "TOTAL ACCESS" in FIG. 1) 128(0)-128(S) may be used to generate an average total number of memory accesses (captioned as "AVG" in FIG. 1) 132, while the accumulated value of the total numbers of retried memory accesses (captioned as "TOTAL RETRY" in FIG. 1) 130(0)-130(S) may be used to generate an average total number of retried memory accesses (captioned as "AVG" in FIG. 1) 134.

The storage controller circuit 106 uses the usage statistic 126(0) (or, in some embodiments, the corresponding average) to determine whether to adjust the memory allocation for the pool 112(0) by modifying the pool threshold value 116(0) corresponding to the pool 112(0). For example, in embodiments in which the pool threshold value 116(0) comprises the maximum threshold value 118(0), the storage controller circuit 106 will use the usage statistic 126(0) comprising the total number of memory accesses 128(0) to determine whether to modify the maximum threshold value 118(0). The storage controller circuit 106 thus may compare the total number of memory accesses 128(0) for the pool 112(0) during the sampling period 124(0) (or the average 132 of the total number of memory accesses 128(0)-128(S) over the sampling periods 124(0)-124(S), in some examples) with a previous total number of memory accesses (captioned as "PREV ACCESS" in FIG. 1) 136 for the pool 112(0). Similarly, in embodiments in which the pool threshold value 116(0) comprises the minimum threshold value 120(0), the storage controller circuit 106 will use the total number of retried memory accesses 130(0) to determine whether to modify the minimum threshold value 120(0). Accordingly, the storage controller circuit 106 may compare the total number of retried memory accesses 130(0) for the pool 112(0) during the sampling period 124(0) with a retry threshold value (captioned as "RETRY THRESH" in FIG. 1) 138.

In response to a determination to modify the pool threshold value 116(0) corresponding to the pool 112(0), the storage controller circuit 106 modifies the pool threshold value 116(0) based on the usage statistic 126(0). For example, in embodiments in which the pool threshold value 116(0) comprises the maximum threshold value 118(0), the storage controller circuit 106 increments the maximum threshold value 118(0) corresponding to the pool 112(0) by an increment value (captioned as "INC" in FIG. 1) 140 if the storage controller circuit 106 determines that the total number of memory accesses 128(0) is greater than the previous total number of memory accesses 136. If the total number of memory accesses 128(0) is less than the previous total number of memory accesses 136, the storage controller circuit 106 decrements the maximum threshold value 118(0) by a decrement value (captioned as "DEC" in FIG. 1) 142. In this manner, higher bandwidth and priority can be granted to pools that are receiving more memory access requests.

In embodiments in which the pool threshold value 116(0) comprises the minimum threshold value 120(0), the storage controller circuit 106 increments the minimum threshold value 120(0) corresponding to the pool 112(0) by an increment value (captioned as "INC" in FIG. 1) 144 if the storage controller circuit 106 determines that the total number of retried memory accesses 130(0) is greater than the retry threshold value 138. If the storage controller circuit 106 determines that the total number of retried memory accesses 130(0) is less than the retry threshold value 138, the storage controller circuit 106 decrements the minimum threshold value 120(0) by a decrement value (captioned as "DEC" in FIG. 1) 146. This prevents a pool from unnecessarily holding space in the dedicated storage device 108, while ensuring that no pool is starved.

The pool threshold values 116(0)-116(P), along with the pool utilization counters 122(0)-122(P), are then used by the storage controller circuit 106 to determine whether to perform subsequent memory access requests. In the example of FIG. 1, the storage controller circuit 106 receives a memory access request 148 directed to the memory device 104 (e.g., from a requestor application executed by the processor device 102, as a non-limiting example). The memory access request 148 comprises an indicator (captioned as "QoS INDICATOR" in FIG. 1) 150 of a QoS level (e.g., the QoS level 114(0) of the pool 112(0)) for the memory access request 148. The storage controller circuit 106 in this example identifies the pool 112(0) as a target pool 112(0) corresponding to the QoS level 114(0). The storage controller circuit 106 then determines, based on the pool utilization counter 122(0) corresponding to the target pool 112(0) and the pool threshold value 116(0) corresponding to the pool 112(0), whether an allocation of the dedicated storage device 108 for the target pool 112(0) allows the memory access request 148 to be performed. For instance, the storage controller circuit 106 may compare the pool utilization counter 122(0) with the maximum threshold value 118(0) corresponding to the target pool 112(0) determine whether the maximum allocation of the dedicated storage device 108 for the target pool 112(0) has been met. If the allocation of the dedicated storage device 108 for the target pool 112(0) allows the memory access request 148 to be performed, the storage controller circuit 106 performs the memory access request 148. The storage controller circuit 106 then updates the pool utilization counter 122(0). However, if the storage controller circuit 106 determines that the allocation of the dedicated storage device 108 for the target pool 112(0) does not allow the memory access request to be performed, the storage controller circuit 106 issues a retry signal 152 for the memory access request 148.

FIGS. 2A-2B provide a flowchart illustrating exemplary operations 200 of the storage controller circuit 106 of FIG. 1 for dynamically adjusting memory allocations based on QoS pool threshold values, according to some embodiments. For the sake of clarity, elements of FIG. 1 are referenced in describing FIGS. 2A-2B. It is to be understood that some operations illustrated in FIGS. 2A-2B may occur in an order other than that illustrated in FIGS. 2A-2B in some embodiments, and/or may be omitted in some embodiments.

The exemplary operations 200 begin in FIG. 2A with a storage controller circuit of a processor-based device (e.g., the storage controller circuit 106 of the processor-based device 100 of FIG. 1) performing a series of operations for each pool (such as the pool 112(0) of FIG. 1) of a plurality of pools (e.g., the plurality of pools 112(0)-112(P) of FIG. 1) that each correspond to one or more QoS levels (such as the QOS levels 114(0)-114(Q), 114'(0)-114'(Q') of FIG. 1) (block 202). The storage controller circuit 106 collects a usage statistic (e.g., the usage statistic 126(0) of FIG. 1) for the pool 112(0) during a sampling period (e.g., the sampling period 124(0) of FIG. 1) (block 204). In some embodiments, the operations of block 204 for collecting the usage statistic 126(0) may comprise the storage controller circuit 106 accumulating a plurality of usage statistics (such as the usage statistics 126(0)-126(S) of FIG. 1) comprising the usage statistic 126(0) over a plurality of sampling periods 124(0)-124(S) comprising the sampling period 124(0) (block 206).

The storage controller circuit 106 subsequently determines, based on the usage statistic 126(0), whether to modify a pool threshold value (e.g., the pool threshold value 116(0) of FIG. 1) corresponding to the pool 112(0) among a plurality of pool threshold values (such as the pool threshold values 116(0)-116(P) of FIG. 1), wherein each pool threshold value of the plurality of pool threshold values 116(0)-116(P) defines an allocation of a dedicated storage device (e.g., the dedicated storage device 108 of FIG. 1) of the storage controller circuit 106 for a corresponding pool of the plurality of pools 112(0)-112(P) (block 208). Some embodiments may provide that the operations of block 208 for determining whether to modify the pool threshold value 116(0) based on the usage statistic 126(0) may comprise the storage controller circuit 106 determining whether to modify the pool threshold value 116(0) corresponding to the pool 112(0) based on an average (e.g., the average 132, 134 of FIG. 1) of the plurality of usage statistics 126(0) (block 210).

In response to a determination to modify the pool threshold value 116(0) corresponding to the pool 112(0), the storage controller circuit 106 modifies the pool threshold value 116(0) based on the usage statistic 126(0) (block 212). In embodiments in which the pool threshold value 116(0) comprises a maximum threshold value (e.g., the maximum threshold value 118(0) of FIG. 1) and the usage statistic 126(0) comprises a total number of memory accesses (e.g., the total number of memory accesses 128(0) of FIG. 1), the operations of block 210 and 212 of FIG. 2A for determining whether to modify the pool threshold value 116(0) corresponding to the pool 112(0) and modifying the pool threshold value 116(0) based on the usage statistic 126(0), respectively, may comprise the exemplary operations illustrated and discussed below with respect to FIG. 3. Similarly, embodiments in which the pool threshold value 116(0) comprises a minimum threshold value (e.g., the minimum threshold value 120(0) of FIG. 1) and the usage statistic 126(0) comprises a total number of retried memory accesses (e.g., the total number of retried memory accesses 130(0) of FIG. 1), may provide that the operations of block 210 and 212 of FIG. 2A comprise the exemplary operations illustrated and discussed below with respect to FIG. 4. In FIG. 2A, the exemplary operations 200 according to some embodiments may continue at block 216 of FIG. 2B.

Referring now to FIG. 2B, the storage controller circuit 106 in some embodiments may receive a memory access request (such as the memory access request 148 of FIG. 1) directed to the memory device 104, wherein the memory access request 148 comprises an indicator (e.g., the indicator 150 of FIG. 1) of a QoS level (such as the QoS level 114(0) of FIG. 1) for the memory access request 148 (block 216). The storage controller circuit 106 in such embodiments next identifies a target pool (e.g., the pool 112(0) of FIG. 1) among the plurality of pools 112(0)-112(P) corresponding to the QoS level 114(0) (block 218). The storage controller circuit 106 then determines, based on a pool utilization counter (e.g., the pool utilization counter 122(0) of FIG. 1) corresponding to the target pool 112(0) among a plurality of pool utilization counters (such as the pool utilization counters 122(0)-122(P) of FIG. 1) and a pool threshold value (e.g., the pool threshold value 116(0) of FIG. 1) corresponding to the pool 112(0) among the plurality of pool threshold values (such as the pool threshold values 116(0)-116(P) of FIG. 1), whether an allocation of the dedicated storage device 108 for the target pool 112(0) allows the memory access request 148 to be performed (block 220). If so, the storage controller circuit 106 performs the memory access request 148 (block 222). The storage controller circuit 106 then updates the pool utilization counter 122(0) (block 224). However, if the storage controller circuit 106 determines at decision block 220 that the allocation of the dedicated storage device 108 for the target pool 112(0) does not allow the memory access request 148 to be performed, the storage controller circuit 106 issues a retry signal (e.g., the retry signal 152 of FIG. 1) for the memory access request 148 (block 226).

As noted above, in some embodiments of the storage controller circuit 106 of FIG. 1, the pool threshold value 116(0) comprises the maximum threshold value 118(0) and the usage statistic 126(0) comprises the total number of memory accesses 128(0). To illustrate exemplary operations performed by the storage controller circuit 106 in such embodiments for determining whether to modify the pool threshold value 116(0) corresponding to the pool 112(0) and modifying the pool threshold value 116(0) based on the usage statistic 126(0), FIG. 3 provides a flowchart illustrating exemplary operations 300. Elements of FIG. 1 are referenced in describing FIG. 3 for the sake of clarity.

In FIG. 3, the exemplary operations 300 begin with the storage controller circuit 106 comparing a total number of memory accesses (e.g., the total number of memory accesses 128(0) of FIG. 1) for a pool 112(0) (such as the pool 112(0) of FIG. 1) during a sampling period 124(0) with a previous total number of memory accesses (e.g., the previous total number of memory accesses 136 of FIG. 1) for the pool 112(0) (block 302). It is to be understood that the operations of decision block 302 correspond to the operations of 208 of FIG. 2A for determining whether to modify the pool threshold value 116(0) corresponding to the pool 112(0). In some embodiments, if the total number of memory accesses 128(0) equals the previous total number of memory accesses 136, the storage controller circuit 106 stores the total number of memory accesses 128(0) for the pool 112(0) during the sampling period 124(0) as the previous total number of memory accesses 136 for the pool 112(0) (block 304).

If the storage controller circuit 106 determines at decision block 302 that the total number of memory accesses 128(0) is greater than the previous total number of memory accesses 136, the storage controller circuit 106 increments a maximum threshold value (e.g., the maximum threshold value 118(0) of FIG. 1) corresponding to the pool 112(0) among a plurality of maximum threshold values (such as the maximum threshold values 118(0)-118(P) of FIG. 1) by an increment value (e.g., the increment value 140 of FIG. 1) (block 306). It is to be understood that the operations of block 306 correspond to the operations of 212 of FIG. 2A for modifying the pool threshold value 116(0) based on the usage statistic 126(0). The exemplary operations 300 then continue at block 304.

Finally, if the storage controller circuit 106 determines at decision block 302 that the total number of memory accesses 128(0) is less than the previous total number of memory accesses 136, the storage controller circuit 106 decrements the maximum threshold value 118(0) corresponding to the pool 112(0) among the plurality of maximum threshold values 118(0)-118(P) by a decrement value (e.g., the decrement value 142 of FIG. 1) (block 308). It is to be understood that the operations of block 308 correspond to the operations of 212 of FIG. 2A for modifying the pool threshold value 116(0) based on the usage statistic 126(0). The exemplary operations 300 then continue at block 304.

Some embodiments of the storage controller circuit 106 of FIG. 1 may provide that the pool threshold value 116(0) comprises the minimum threshold value 120(0) and the usage statistic 126(0) comprises the total number of retried memory accesses 130(0) of FIG. 1. In this regard, FIG. 4 provides a flowchart illustrating exemplary operations 400 for determining whether to modify the pool threshold value 116(0) corresponding to the pool 112(0) and modifying the pool threshold value 116(0) based on the usage statistic 126(0). For the sake of clarity, elements of FIG. 1 are referenced in describing FIG. 4.

In FIG. 4, the storage controller circuit 106 first compares a total number of retried memory accesses (e.g., the total number of retried memory accesses 130(0) of FIG. 1) for a pool (such as the pool 112(0) of FIG. 1) during a sampling period (e.g., the sampling period 124(0) of FIG. 1) with a retry threshold value (such as the retry threshold value 138 of FIG. 1) (block 402). It is to be understood that the operations of decision block 402 correspond to the operations of 208 of FIG. 2A for determining whether to modify the pool threshold value 116(0) corresponding to the pool 112(0).

If the storage controller circuit 106 determines at decision block 402 that the total number of retried memory accesses 130(0) is greater than the retry threshold value 138, the storage controller circuit 106 in some embodiments may also determine whether a sum of each minimum threshold value of the plurality of minimum threshold values (e.g., the minimum threshold values 120(0)-120(P) of FIG. 1) is less than a total number of memory locations (such as the memory locations 110(0)-110(M) of FIG. 1) of a dedicated storage device (e.g., the dedicated storage device 108 of FIG. 1) (block 404). If so, the storage controller circuit 106 increments a minimum threshold value (e.g., the minimum threshold value 120(0) of FIG. 1) corresponding to the pool 112(0) among the plurality of minimum threshold values 120(0)-120(P) by an increment value (such as the increment value 144 of FIG. 1) (block 406). It is to be understood that the operations of blocks 404 and 406 correspond to the operations of 212 of FIG. 2A for modifying the pool threshold value 116(0) based on the usage statistic 126(0). However, if the storage controller circuit 106 determines at decision block 404 that the sum of each minimum threshold value of the plurality of minimum threshold values 120(0)-120(P) is equal to or greater than the total number of the memory locations 110(0)-110(M) of the dedicated storage device 108, the storage controller circuit 106 leaves the minimum threshold value 120(0) unchanged (block 408).

If the storage controller circuit 106 determines at decision block 402 that the total number of retried memory accesses 130(0) is less than the retry threshold value 138, the storage controller circuit 106 decrements the minimum threshold value 120(0) corresponding to the pool 112(0) among the plurality of minimum threshold values 120(0)-120(P) by a decrement value 146 (block 410). It is to be understood that the operations of block 410 correspond to the operations of 212 of FIG. 2A for modifying the pool threshold value 116(0) based on the usage statistic 126(0).

FIG. 5 is a block diagram of an exemplary processor-based device 500 that includes a processor 502 (e.g., a microprocessor) that includes an instruction processing circuit 504. The processor-based device 500 can be the processor-based device 100 in FIG. 1 as an example. The processor-based device 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 502 represents one or more general-purpose processing circuits, such as a microprocessor, central processing unit, or the like. The processor 502 is configured to execute processing logic in instructions for performing the operations and steps discussed herein. In this example, the processor 502 includes an instruction cache 506 for temporary, fast access memory storage of instructions accessible by the instruction processing circuit 504. Fetched or prefetched instructions from a memory, such as from the system memory 508 over a system bus 510, are stored in the instruction cache 506. The instruction processing circuit 504 is configured to process instructions fetched into the instruction cache 506 and process the instructions for execution.

The processor 502 and the system memory 508 are coupled to the system bus 510 and can intercouple peripheral devices included in the processor-based device 500. As is well known, the processor 502 communicates with these other devices by exchanging address, control, and data information over the system bus 510. For example, the processor 502 can communicate bus transaction requests to a controller circuit 512 in the system memory 508 as an example of a subordinate device. Although not illustrated in FIG. 5, multiple system buses 510 could be provided, wherein each system bus constitutes a different fabric. In this example, the controller circuit 512 is configured to provide memory access requests to a memory array 514 in the system memory 508, and corresponds in functionality to the storage controller circuit 106 of FIG. 1. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 510. As illustrated in FIG. 5, these devices can include the system memory 508, one or more input device(s) 518, one or more output device(s) 520, a modem 522, and one or more display controllers 524, as examples. The input device(s) 518 can include any type of input device, including but not limited to input keys, switches, voice processors, etc. The output device(s) 520 can include any type of output device, including but not limited to audio, video, other visual indicators, etc. The modem 522 can be any device configured to allow exchange of data to and from a network 526. The network 526 can be any type of network, including but not limited to a wired or wireless network, a private or public network, a local area network (LAN), a wireless local area network (WLAN), a wide area network (WAN), a BLUETOOTH™ network, and the Internet. The modem 522 can be configured to support any type of communications protocol desired. The processor 502 may also be configured to access the display controller(s) 524 over the system bus 510 to control information sent to one or more displays 528. The display(s) 528 can include any type of display, including but not limited to a cathode ray tube (CRT), a liquid crystal display (LCD), a plasma display, etc.

The processor-based device 500 in FIG. 5 may include a set of instructions 530 to be executed by the processor 502 for any application desired according to the instructions. The instructions 530 may be stored in the system memory 508, processor 502, and/or instruction cache 506 as examples of a non-transitory computer-readable medium. The instructions 530 may also reside, completely or at least partially, within the system memory 508 and/or within the processor

502 during their execution. The instructions 530 may further be transmitted or received over the network 526 via the modem 522.

While the computer-readable medium is described herein in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the processor-based devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device comprising:
a memory device;
a dedicated storage device configured to selectively store memory accesses directed to the memory device before providing the stored memory accesses to the memory device, wherein the memory accesses are categorized into a plurality of access categories; and
control logic configured to control the dedicated storage device, wherein controlling the dedicated storage device comprises:
allocating a plurality of pools, wherein each pool of the plurality of pools is a logical portion of the dedicated storage device and corresponds to one or more access categories of the plurality of access categories;
for each of the plurality of pools, setting a corresponding allocation constraint of a plurality of allocation constraints for stored memory accesses of the one or more access categories of the corresponding pool; and
for each pool of the plurality of pools, dynamically updating the allocation constraint in response to usage of the pool, dynamically updating the allocation constraint comprising:
determining the usage of the pool;
evaluating whether the usage of the pool exceeds a threshold; and
responsive to the usage of the pool exceeding the threshold, modifying the allocation constraint, wherein dynamically updating the allocation constraint maintains request throughput of the memory accesses over variations in the usage of the pools.

2. The processor-based device of claim 1, wherein:
the control logic is configured to determine the usage of the pool by collecting a usage statistic for the pool during a sampling period by being configured to accumulate a plurality of usage statistics comprising the usage statistic over a plurality of sampling periods comprising the sampling period; and
the control logic is configured to evaluate whether the usage of the pool exceeds the threshold based on an average of the plurality of usage statistics.

3. The processor-based device of claim 1, wherein:
the control logic is configured to determine the usage of the pool by collecting a usage statistic for the pool during a sampling period;
the usage statistic comprises a total number of memory accesses for the pool during the sampling period; and the control logic is configured to evaluate whether the usage of the pool exceeds a threshold by being configured to compare the total number of memory accesses for the pool during the sampling period with a previous total number of memory accesses for the pool.

4. The processor-based device of claim 3, wherein:

the control logic sets the plurality of allocation constraints by maintaining a plurality of pool threshold values corresponding to the plurality of pools;

the plurality of pool threshold values comprises a plurality of maximum threshold values corresponding to the plurality of pools, wherein each maximum threshold value represents a maximum number of memory locations of the dedicated storage device that are allocated for the corresponding pool; and the control logic is configured to modify the pool threshold value based on the usage statistic by being configured to:

increment a maximum threshold value corresponding to the pool among the plurality of maximum threshold values by an increment value, responsive to determining that the total number of memory accesses for the pool during the sampling period is greater than the previous total number of memory accesses for the pool during the previous sampling period; and decrement the maximum threshold value corresponding to the pool among the plurality of maximum threshold values by a decrement value, responsive to determining that the total number of memory accesses for the pool during the sampling period is less than the previous total number of memory accesses for the pool during the previous sampling period.

5. The processor-based device of claim 4, wherein the control logic is further configured to store the total number of memory accesses for the pool during the sampling period as the previous total number of memory accesses for the pool.

6. The processor-based device of claim 1, wherein:

the control logic is configured to determine the usage of the pool by collecting a usage statistic for the pool during a sampling period;

the usage statistic comprises a total number of retried memory accesses for the pool during the sampling period; and the storage controller circuit is configured to determine whether to evaluate whether the usage of the pool exceeds a threshold by being configured to compare the total number of retried memory accesses for the pool during the sampling period with a retry threshold value.

7. The processor-based device of claim 6, wherein:

the control logic sets the plurality of allocation constraints by maintaining a plurality of pool threshold values corresponding to the plurality of pools;

the plurality of pool threshold values comprises a plurality of minimum threshold values corresponding to the plurality of pools, wherein each minimum threshold value represents a minimum number of memory locations of the dedicated storage device that are allocated for the corresponding pool; and the control logic is configured to modify the allocation constraint by being configured to:

increment a minimum threshold value corresponding to the pool among the plurality of minimum threshold values by an increment value, responsive to determining that the total number of retried memory accesses for the pool during the sampling period is greater than the retry threshold value; and decrement the minimum threshold value corresponding to the pool among the plurality of minimum threshold values by a decrement value, responsive to determining that the total number of retried memory accesses for the pool during the sampling period is less than the retry threshold value.

8. The processor-based device of claim 7, wherein the control logic is configured to increment the minimum threshold value by the increment value by being configured to:

determine whether a sum of each minimum threshold value of the plurality of minimum threshold values is less than a total number of memory locations of the dedicated storage device; and increment the minimum threshold value by the increment value responsive to determining that the sum of each minimum threshold value is less than the total number of memory locations of the dedicated storage device.

9. The processor-based device of claim 1, wherein:

the control logic further comprises a plurality of pool utilization counters corresponding to the plurality of pools; and the control logic is further configured to:

receive a memory access directed to the memory device, wherein the memory access comprises an indicator of an access category for the memory access;

identify a target pool among the plurality of pools corresponding to the access category;

determine, based on a pool utilization counter corresponding to the target pool among the plurality of pool utilization counters and an allocation constraint corresponding to the pool among the plurality of allocation constraints, whether an allocation of the dedicated storage device for the target pool allows the memory access to be performed; and responsive to determining that the allocation of the dedicated storage device for the target pool allows the memory access to be performed, perform the memory access.

10. The processor-based device of claim 9, wherein the control logic is further configured to, further responsive to determining that the allocation of the dedicated storage device for the target pool allows the memory access to be performed, update the pool utilization counter.

11. The processor-based device of claim 9, wherein the control logic is further configured to, responsive to determining that the allocation of the dedicated storage device for the target pool does not allow the memory access to be performed, issue a retry signal for the memory access.

12. A method for dynamically adjusting memory allocations, comprising:

for each pool of a plurality of pools, wherein memory accesses are categorized into a plurality of access categories, and wherein each pool of the plurality of pools is a logical portion of a dedicated storage device and corresponds to one or more access categories of the plurality of access categories:

determining usage of the pool;

evaluating whether the usage of the pool exceeds a threshold, wherein a corresponding allocation constraint of a plurality of allocations constraints is set for stored memory access of the one or more access categories of the corresponding pool; and responsive to the usage of the pool exceeding the threshold, modifying the allocation constraint, wherein modifying the allocation constraint maintains request throughput of the memory accesses over variations in the usage of the pools.

13. The method of claim 12, wherein:
determining the usage of the pool comprises collecting a usage statistic for the pool during the sampling period, which comprises accumulating a plurality of usage statistics comprising the usage statistic over a plurality of sampling periods comprising the sampling period; and
evaluating whether the usage of the pool exceeds a threshold is based on an average of the plurality of usage statistics.

14. The method of claim 12, wherein:
determining the usage of the pool comprises collecting a usage statistic for the pool during a sampling period;
the usage statistic comprises a total number of memory accesses for the pool during the sampling period; and
evaluating whether the usage of the pool exceeds a threshold comprises comparing the total number of memory accesses for the pool during the sampling period with a previous total number of memory accesses for the pool.

15. The method of claim 14, further comprising:
for each of the plurality of pools, setting a corresponding allocation constraint of the plurality of allocation constraints by maintaining a corresponding pool threshold value of a plurality of pool threshold values corresponding to the plurality of pools, wherein:
the plurality of pool threshold values comprises a plurality of maximum threshold values corresponding to the plurality of pools, wherein each maximum threshold value represents a maximum number of memory locations of the dedicated storage device that are allocated for the corresponding pool; and
modifying the allocation constraint comprises incrementing a maximum threshold value corresponding to the pool among the plurality of maximum threshold values by an increment value, responsive to determining that the total number of memory accesses for the pool during the sampling period is greater than the previous total number of memory accesses for the pool during the previous sampling period.

16. The method of claim 14, wherein:
the plurality of pool threshold values comprises a plurality of maximum threshold values corresponding to the plurality of pools, wherein each maximum threshold value represents a maximum number of memory locations of the dedicated storage device that are allocated for the corresponding pool; and
modifying the pool threshold value based on the usage statistic comprises decrementing a maximum threshold value corresponding to the pool among the plurality of maximum threshold values by a decrement value, responsive to determining that the total number of memory accesses for the pool during the sampling period is less than the previous total number of memory accesses for the pool during the previous sampling period.

17. The method of claim 12, wherein:
determining the usage of the pool comprises collecting a usage statistic for the pool during a sampling period;
the usage statistic comprises a total number of retried memory accesses for the pool during the sampling period; and
evaluating whether the usage of the pool exceeds a threshold comprises comparing the total number of retried memory accesses for the pool during the sampling period with a retry threshold value.

18. The method of claim 17, wherein:
the plurality of pool threshold values comprises a plurality of minimum threshold values corresponding to the plurality of pools, wherein each minimum threshold value represents a minimum number of memory locations of the dedicated storage device that are allocated for the corresponding pool; and
modifying the allocation constraint comprises incrementing the minimum threshold value by an increment value, responsive to determining that the total number of retried memory accesses for the pool during the sampling period is greater than the retry threshold value.

19. The method of claim 17, wherein:
the plurality of pool threshold values comprises a plurality of minimum threshold values corresponding to the plurality of pools, wherein each minimum threshold value represents a minimum number of memory locations of the dedicated storage device that are allocated for the corresponding pool; and
modifying the allocation constraint comprises decrementing the minimum threshold value by a decrement value, responsive to determining that the total number of retried memory accesses for the pool during the sampling period is less than the retry threshold value.

20. A non-transitory computer-readable medium, having stored thereon computer-executable instructions that, when executed by a processor device, cause the processor device to:
for each pool of a plurality of pools, wherein memory accesses are categorized into a plurality of access categories, and wherein each pool of the plurality of pools is a logical portion of a dedicated storage device and corresponds to one or more access categories of the plurality of access categories:
determine usage of the pool;
evaluate whether the usage of the pool exceeds a threshold, wherein a corresponding allocation constraint of a plurality of allocations constraints is set for stored memory access of the one or more access categories of the corresponding pool; and
responsive to the usage of the pool exceeding the threshold, modifying the allocation constraint, wherein modifying the allocation constraint maintains request throughput of the memory accesses over variations in the usage of the pools.

* * * * *